United States Patent [19]
Fletcher et al.

[11] 3,924,176
[45] Dec. 2, 1975

[54] MAGNETOMETER USING SUPERCONDUCTING ROTATING BODY

[76] Inventors: James C. Fletcher, Administrator of the National Aeronautics and Space Administration, with respect to an invention of Melvin M. Saffren, Altadena; Daniel D. Elleman, La Canada, both of Calif.

[22] Filed: Nov. 11, 1974

[21] Appl. No.: 522,552

[52] U.S. Cl............................................... 324/43 R
[51] Int. Cl.²......................................... G01R 33/02
[58] Field of Search........ 324/43 R, 43 L, 43 G, 47, 324/43 SC

[56] References Cited
UNITED STATES PATENTS

| | | | |
|---|---|---|---|
| 3,454,875 | 7/1969 | Bol et al............................ | 324/43 R |
| 3,667,033 | 5/1972 | Davis................................. | 324/43 R |

*Primary Examiner*—Alfred E. Smith
*Assistant Examiner*—Ernest F. Karlsen
*Attorney, Agent, or Firm*—Monte F. Mott; Paul F. McCaul; John R. Manning

[57] ABSTRACT

A method and apparatus for measuring the strength and direction of an unknown magnetic field are disclosed. A freely rotatable suspended superconducting body, such as a sphere, is maintained at a superconducting temperature. A magnetic field to be measured induces super current flow on the sphere's surface. The induced current causes the sphere to rotate at a rate that is proportional to the strength of the field, and the axis of rotation of the sphere aligns with the direction of the magnetic field to be measured. An operator applies current to orthogonal electro-magnetic coils arranged relative to the sphere so as to apply variable magnetic fields to the sphere. Varying the current and the resulting fields nulls out the effect of the magnetic field to be measured. As the field is nulled out, the angular momentum generated by the superconducting current flow is reduced to zero and the sphere stops rotating. An operator or an optical monitoring system determines the amount of current required by the electro-magnetic coils to achieve nulling. The measurement of the nulling currents thus can indicate the direction and strength of the unknown magnetic field.

22 Claims, 2 Drawing Figures

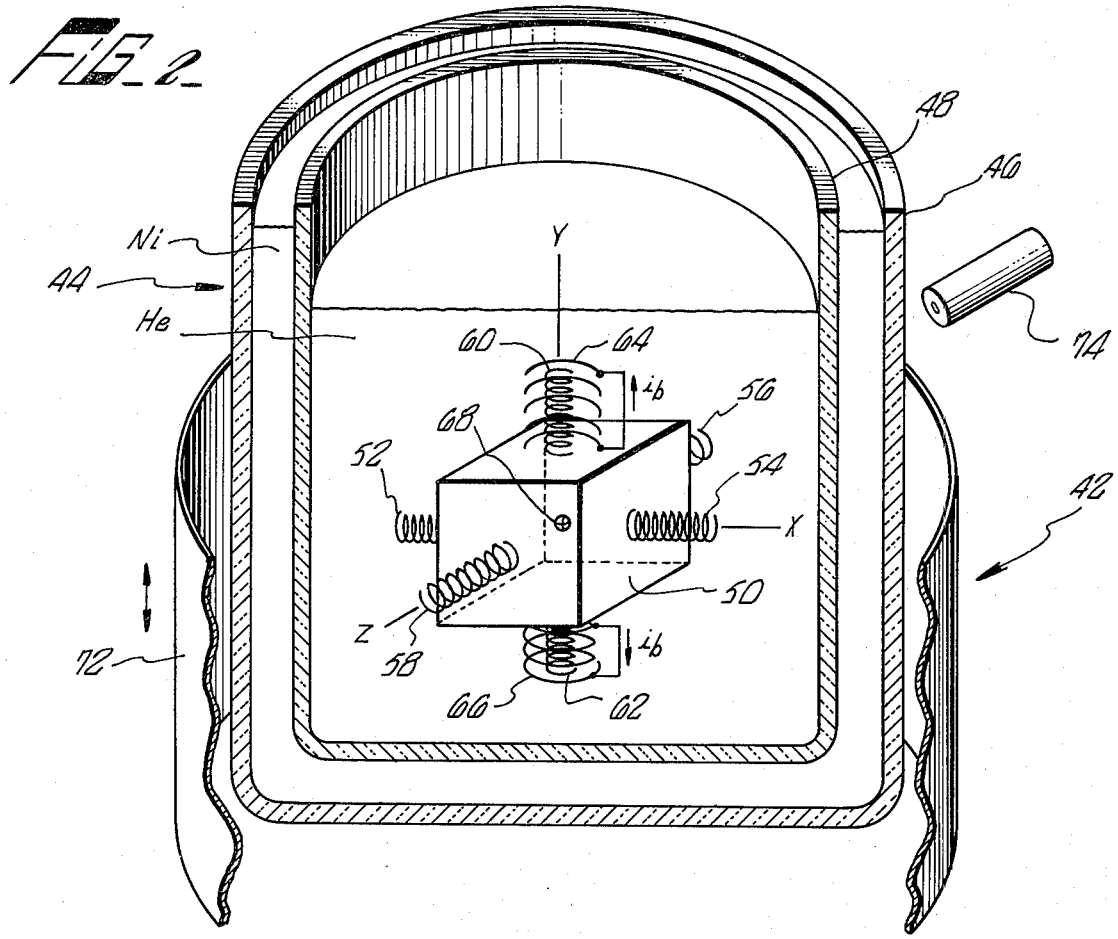
FIG_2_
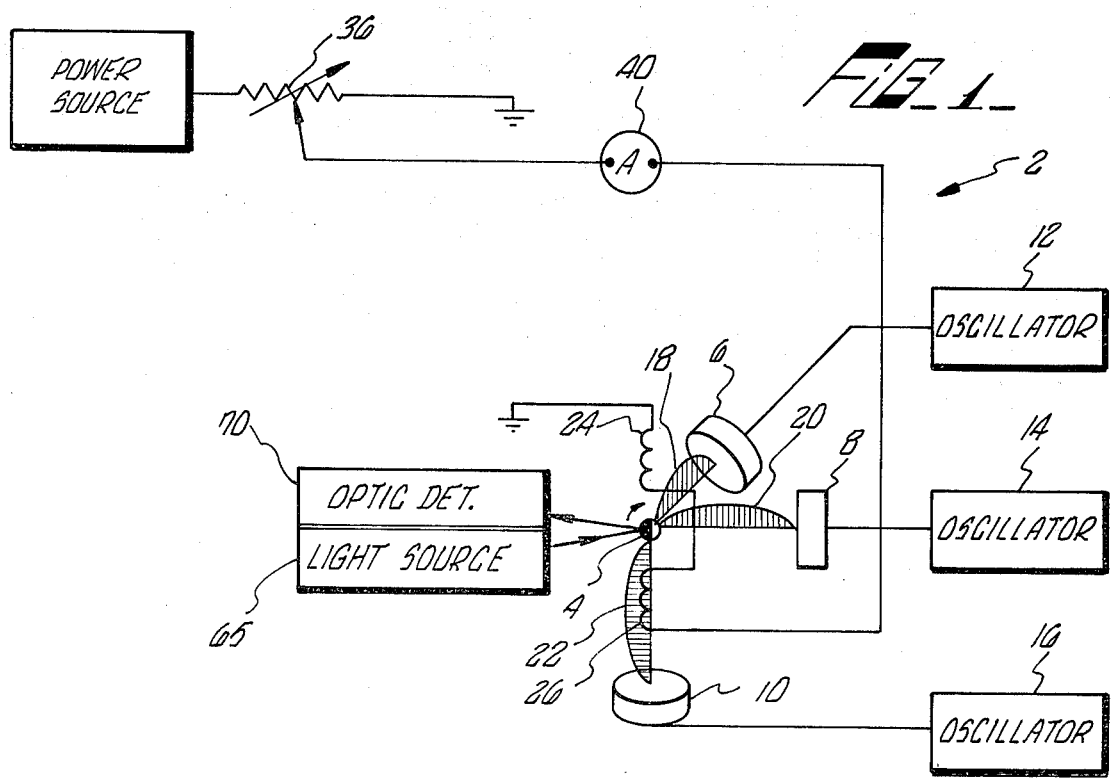
FIG_1_

MAGNETOMETER USING SUPERCONDUCTING ROTATING BODY

BACKGROUND OF THE INVENTION

Origin of the Invention

The invention described herein was made in the performance of work under a NASA contract and is subject to the provisions of Section 305 of the National Aeronautics and Space Act of 1958, Public Law 85-568 (72 Stat. 435; U.S.C. 2457).

FIELD OF THE INVENTION

The present invention is directed to the measurement of magnetic fields and more particularly to the measurement of both the strength and direction of the field with a cryogenic magnetometer.

DESCRIPTION OF THE PRIOR ART

Various magnetic sensors and forms of magnetometers have been utilized in the prior art to measure both magnetic field vectors and gradients. For example, magnetometer instruments have been employed on orbital, lunar and planetary space missions to support scientific investigation of terrestrial and other magnetic fields.

One such magnetometer works on the physical principle that the transparency of a plasma of metastable helium atoms to a beam of resonant radiation of 1.083 $\mu$ wavelength is directly dependent upon an applied magnetic field. A set of Helmholtz coils are utilized to produce a rotating magnetic field vector in the helium plasma as it is contained in an absorption cell. A detector senses the actual modulation of the light beam in the absorption cell. Any asymmetry in the resultant magnetic field, which is the vector sum of the sweep vector and the ambient field being measured, causes an asymmetry in the light modulation. With a sweep vector of constant amplitude and angular frequency, external DC fields cause a component in the modulation at the frequency of the sweep vector which is phase dependent on the direction of the field with respect to the axis of the light. In the absence of external fields, the modulation of the light beam is at twice the frequency of the sweep vector. Any fundamental component caused by an ambient magnetic field is amplified by appropriate system electronics and synchronously demodulated. The demodulated signal is integrated, amplified and fed back as current to the sensor coil system to null out the external field. The voltage output of the system is directly proportional to the magnetic field component being nulled out. The sweep vector is commutated between the x-z plane (z being the light axis) and the y-z plane to provide three axis operation.

Another prior art magnetometer is shown in U.S. Pat. No. 3,800,213 which discloses a fluxgate type of magnetic sensor utilizing magnetic field sensor coils having mutually orthogonal magnetic axes for appropriately sensing ambient magnetic field components. A hollow cylinder is positioned within the sensor coils and supports a driving coil for producing a time varying permeability in the core. The sensing coils and the driving coil are mounted on a universal bracket for permitting orthogonal movement.

Various magnetometers have been suggested that utilize one or more components that are maintained in a cryogenic temperature range. For example, the U.S. Pat. No. 3,454,875 discloses serially connected superconductive loops for measuring magnetic fields. Basically, the residual superconducting current flow in the loops are reduced to zero and then the ambient field to be measured is coupled into the loops thereby inducing a superconducting current which would be proportional to the magnetic field. Sensors are provided for subsequently measuring the induced current as indicative of the strength of the magnetic field. Another cryogenic magnetometer is disclosed in U.S. Pat. No. 3,667,033, wherein three superconducting sensor loops are utilized to receive induced current from an ambient magnetic field. A Josephson device sequentially senses the current in the sensor loops and controls a bucking current to nullify the current flowing in the individual loops. The amount of current required to reduce the superconducting current flow to zero is used as a measure of the intensity of the magnetic field.

The use of a suspended body in a magnetometer has been suggested in U.S. Pat. No. 3,721,984. A levitational magnetic field suspends the magnetic body below a magnetic toroid body having a small short nonmagnetic gap. The intensity of the magnetic field is measured as a function of the relative position of the ball to that of the gap in the toroid. However, the use of a conventional levitational magnetic field has been recognized in the prior art as inherently having a natural axial instability and has required servo systems to align and maintain the suspended body along the axis of the suspension magnet, see "Improved Magnetic Suspension System" by McIlwraith et al, Review of Scientific Instruments, Vol. 29, no. 11, at p. 1029 (1958). Superconductors, being diamagnetic, are repelled rather than attracted by sources of magnetic field. This characteristic makes possible an inherently stable support, unlike ferromagnetic or electrostatic suspensions which require feedback systems. From a physical quantum mechanics viewpoint, the influence of the surface flow of electrons at a superconducting temperature permits a non-classical stabilization of the forces on the total system because they are not dissipating.

A magnetic suspension system utilizing an optical position sensing feed back system is disclosed in U.S. Pat. No. 3,370,205. Basically, the magnetic suspension system includes three sets of magnetic bias coils combined with optic sensors for suspending a model of a plane in a wind stream without distorting the flow pattern of the wind stream.

U.S. Pat. Nos. 3,261,210 and 3,175,405 are cited of general interest simply to disclose superconductive elements in measuring equipment.

Experiments have also been performed in the field of cryogenic gyros. A cryogenic gyro has been suggested which would consist of a spinning superconducting sphere levitated in a vacuum by a magnetic field. As recognized by artisans in the art of gyroscopes, the prime concern is to provide a rotor substantially free of exterior torque errors. The advantages of a cryogenic gyro are based on the possibility of creating a torqueless suspension of a superconducting sphere. This possibility exists as a result of the boundary condition imposed by the Meissner effect, that is the normal component of the magnetic field vanishes at the superconducting surface with the result that the magnetic forces on a superconductor are exerted normal to its surface. The suggested cryogenic gyro surface would be a perfect sphere, and it was proposed that all forces would pass through the center of the mass and no torques could be created regardless of the ambient or applied external fields.

Summarizing, the prior art has required relatively complex and elaborate instrumentation for determining the strength and gradient of a magnetic field. In addition, the prior art devices have not taken advantage of the reduced or substantially zero gravity that can be experienced in a space mission.

OBJECTS AND SUMMARY OF THE INVENTION

It is a primary object of the present invention to measure the direction and strength of a magnetic field by employing a superconducting freely rotatable body.

It is another object of the present invention to measure the direction of a magnetic field by detecting the axis of rotation of a superconducting freely rotatable body.

It is a further object of the present invention to suspend a freely rotatable body between at least a pair of electrically isolated closed loop superconducting coils.

It is yet another object of the present invention to null the magnetic field induced rotation of the superconducting body by generating a magnetic field component which opposes the rotation and senses the current required to achieve the null condition.

It is yet a further object of the present invention to suspend the body with an acoustical standing wave pressure pattern.

Briefly described, the present invention utilizes the analog of the de-Haas Van Alphen effect in superconductors to measure the strength and direction of the uniform component of a magnetic field. This is accomplished by freely suspending a superconducting body, such as a sphere, in a cryogenic environment. The sphere can be suspended by means of three pairs of mutually orthogonal coils or by an acoustical standing wave pressure pattern.

The important feature of the suspension is to permit the sphere to freely respond to the induced rotational angular momentum caused by the flow of a "screening" superconducting current on the surface of the sphere. The axis of rotation of the sphere points along the direction of the uniform component of the sampled magnetic field and the rate of rotation about the axis is proportional to the strength of the magnetic field to be sampled. Means are provided for nulling the rotation of the sphere by the creation of a counter magnetic field, having a uniform component opposing the direction of the sampled magnetic field.

Further objects and the many attendant advantages of the invention may be best understood by reference to the following detailed description taken in conjunction with the accompanying drawings in which like reference symbols designate like parts throughout the figures thereof.

BRIEF DESCRIPTION OF THE DRAWINGS

FIG. 1 is a simplified schematic of a magnetometer of the present invention for measuring the strength of the magnetic field having a known direction.

FIG. 2 is a cross-sectional perspective schematic of another magnetometer of the present invention for measuring the strength and direction of an unknown magnetic field.

DESCRIPTION OF THE PREFERRED EMBODIMENT

The theoretical explanation for the features of the magnetometer of the present invention can be described as a utilization of the analog of the de-Haas Van Alphen effect in superconductors. In simple terminology, a freely suspended superconducting body rotates in the presence of a magnetic field with its axis of rotation pointing along the direction of the field, and its rate of rotation proportional to the magnitude of the field.

The rotation of the body is a consequence of the Meissner effect, that is, the tendency for a superconductor to exclude magnetic fields from penetrating the interior of the body. Actually, it is believed that the external field vanishes at least within a few hundred Angstroms of penetration depth and that the magnetic surface essentially coincides with its geometrical surface. To exclude such a field, electron current proportional to the field flow on the surface of the superconductor are created. The motion of these "screening" electrons about the surface of the superconducting body results in the creation of an angular momentum force on the body. Because the angular momentum of the entire body must be the same as it was before the external field is applied, the body takes on a rotational angular momentum equal but opposite to that of the flow of screening electrons. Consequently, the body rotates in a direction opposite to the direction of movement of the screening electrons.

Using London's equations of superconductivity we find, in fact, that if $\underline{w}$ denotes the angular velocity of a body, such as a sphere, in radians/second, then $\underline{w}$ must satisfy the following equation;

$$\frac{d\underline{w}}{dt} = \frac{|e|}{2Mc} \frac{d\underline{b}}{dt} + \underline{w} \times \underline{b} \qquad (1)$$

where $t$ is the time, $|e|$ is the absolute value of the electronic charge, $c$ is the velocity of light, $M$ is the mass of an atom of superconducting material, and $\underline{b}$ is proportional to the external magnetic field $\underline{B}$ and is given by $$\underline{b} = \alpha \left[ 1 - \frac{m}{m+M}\alpha \right]^{-1} \underline{B} \qquad (2)$$

$$\alpha = 15 \frac{i_2\left(\frac{R}{\lambda}\right)}{\left(\frac{R}{\lambda}\right)^2 i_0\left(\frac{R}{\lambda}\right)} \qquad (3)$$

Where $m$ denotes the mass of an electron, $R$ is the radius of the sphere, $\lambda$ is the London penetration depth for the superconductor and $i_0$ and $i_2$ denote the spherical Bessel Functions of imaginary argument of orders zero and two respectively.

When the sphere is not rotating and is made superconducting in zero field, then equation (1) for $w$, is simply integrated to yield;

$$\underline{w} = \frac{|e|}{2Mc} \underline{b} \qquad (4)$$

For $\lambda \cong 10^{-5}$ cm and $R \cong 5$ we find
$\underline{w} = 10^{-3} \underline{B}$ If the external field is non-uniform, we must reinterpret the field "$\underline{B}$". The non-uniform external field, the field to be measured, is then denoted by $(\underline{B})$, and is the field if the sphere were absent.

The difference between the ambient magnetic field and the field $(\underline{B})$ is the magnetic field generated by the supercurrent flow induced in the sphere by $(\underline{B})$. The field $(\underline{B})$ may be expanded in a multipole expansion relative to the point in space coincident with the center of the sphere.

If the multipole expansion is written as $$(\underline{B}) = (\underline{B}_1) + (\underline{B}_2) + (\underline{B}_3) + \ldots \quad (6)$$

then $(\underline{B}_1)$ is a constant independent of the spatial coordinates, $(\underline{B}_2)$ is linear in the spatial coordinates, $(\underline{B}_3)$ is quadratic . . . , etc. Our analysis shows that in such a non-uniform field the field "$\underline{B}$" appearing in the expression for the angular velocity of the sphere must be replaced by $(\underline{B}_1)$. Consequently it is this part of the field that is measured by the angular velocity of the sphere.

In a non-uniform field there are forces on the sphere other than torque; such as translational forces. In a non-uniform field there exists a non-uniform magnetic "pressure" and this pressure gradient results in a "buoyant" force on the sphere. This force may be understood in a more precise way as follows. The dipole moment induced in the sphere by the uniform field $(\underline{B}_1)$ interacts with the "linear" part of the field, $(\underline{B}_2)$, yielding a force proportional to $$[(\underline{B}_1) \cdot \nabla](\underline{B}_2).$$

Similarly, $(\underline{B}_2)$ induces a quadrupole moment which interacts with the "Quadratic" part of the field $(\underline{B}_3)$, yielding a force proportional to $$[(\underline{B}_2) \cdot \nabla](\underline{B}_3).$$

Our analysis shows, in fact that $(\underline{B})$ is closest to being linear in its coordinates, when;

$$(\underline{B}) = (\underline{B})_1 + (\underline{B})_2 \quad (7)$$

The force, in dynes, on the sphere can be set forth as;

$$F = \frac{R^5}{2\pi\lambda^2} \frac{i_2\left(\frac{R}{\lambda}\right)}{-\left(\frac{R}{\lambda}\right)^2 i_0\left(\frac{R}{\lambda}\right)} [(\underline{B})_1 \cdot \nabla](\underline{B})_2 \quad (8)$$

The acceleration is $$a = \frac{3}{8\pi^2\sigma} \frac{i_2\left(\frac{R}{\lambda}\right)}{i_0\left(\frac{R}{\lambda}\right)} [(\underline{B})_1 \cdot \nabla](\underline{B})_2 \quad (9)$$

where $\sigma$ denotes the mass density of the superconductor.

For
$$R = 5\lambda, \lambda \cong 10^{-5} \text{ cm}$$
then,
$$\underline{F} \cong 10^{-14} - [(\underline{B})_1 \cdot \nabla](\underline{B})_2 \quad (10)$$
and for $\sigma = 5$
$$\underline{a} \cong 10^{-2} [(\underline{B})_1 \cdot \nabla](\underline{B})_2 \quad (11)$$
For a large sphere, say $R = 1$ cm,
$$a \cong [(\underline{B}) \cdot \nabla](\underline{B})_2 \quad (12)$$

To counterbalance this generated force on the sphere, forces can be applied to the sphere using three pairs of coils, each pair generating a field having a variable gradient. Each coil in a pair and the currents therein are arranged to "buck" the field created by the other coil.

The coil pairs can also serve the dual function of applying a counter uniform magnetic component to the sphere for nulling its rotation. The direction and strength of the counter uniform component generated by the coil paris are indicative respectively of the direction and strength of the magnetic field that is being measured. To simplify the electronics involved, separate coil pairs from that of the bucking or gradient field coil pairs can be utilized to provide the counter uniform component magnetic field for nullifying the rotation of the sphere.

Referring to FIG. 1, a simplified schematic of one embodiment of a magnetometer of the present invention is disclosed. In this embodiment, the magnetometer 2 comprises means for supporting a body such as a sphere 4 in a cryogenic environment. For purposes of simplicity the Dewar container which would support a liquid helium bath is not shown. Generally, the sphere 4 is maintained at a temperature below 20°K which is below the critical temperature of the material of the sphere 4. Appropriate superconducting material can be utilized for the sphere 4 such as lead, tin, niobium, technetium, etc. also the sphere 4 can be solid or hollow. The sphere 4 can be immersed in liquid helium if desired or suspended in a vacuum. An important feature of the suspension means is that it must permit the sphere 4 to be freely responsive to the induced rotational angular momentum caused by the flow of the "screening" superconducting current on the surface of the sphere 4. This free suspension permits the axis of rotation of the sphere 4 to align itself with the direction of the uniform component of the inducing magnetic field. As discussed above, magnetic coils can be utilized to levitate the sphere 4 for free rotation. The term free rotation, is to be understood to mean uninhibited movement of the sphere 4 spatially about a mutually orthogonal coordinate system.

FIG. 1 discloses a suspension system that would be of particular value in zero gravity conditions. This system supplies sound waves along mutually orthogonal coordinates at a frequency for each direction that establishes a standing wave pressure pattern so that the sphere is automatically held at the intersection of the nodes or location of minimum pressure. The Dewar chamber (not shown) can have a parallelepiped shape with rectangular cross sections. Three transducers 6, 8 and 10 can be positioned adjacent the mutually orthogonal walls of the chamber to produce acoustic waves in the chamber. The respective transducers can be appropriately driven by three oscillators 12, 14 and 16. Since the sphere 4 is by necessity of low weight, and in fact may be hollow, it is extremely responsive to the acoustical pressure. The sphere 4 will be held at a minimum pressure node because any deviation from that node will increase the pressure node on one side of the sphere 4 which will in turn urge the sphere 4 back towards the center of the node. It should be noted that a spherical chamber could be utilized in which a standing wave pattern will be established by vibrating the walls of the spherical chamber at a frequency that establishes the node position at the center of the chamber. The applied frequency to the spherical chamber will generally be the fundamental resonant frequency of the spherical chamber or some harmonic thereof. A graphic illustration of the acoustical pressure standing wave form is disclosed respectively for each coordinate as 18, 20 and 22.

The magnetometer 2 of FIG. 1 is designed specifically to measure the strength of a magnetic field having a known direction such as the earth's magnetic field. For this reason only, a pair of coils 24 and 26 are aligned along one axis of the sphere 4, and the axis of these coils must be pre-aligned with the direction of a uniform component of the magnetic field to be measured. The coils 24 and 26 are capable of generating a magnetic field with a uniform component that will counter the induced rotation from the sampled or measured magnetic field. As can be understood by those skilled in the art, three pairs of mutually orthogonally positioned coils could be utilized with a similar sensor supporting circuitry to also determine the direction of an unknown magnetic field. In this regard, reference is made to the Duke's et al U.S. Pat. No. 3,370,205 granted Feb. 20, 1968 which discloses a magnetic suspension system utilizing a mutually orthogonal magnetic coil arrangement with a plurality of light sensing units connected in a feed back arrangement. The subject matter of this patent is incorporated herein by reference.

The sphere 4 can have half of its surface area carrying an indicia that is non-reflective to the light from a source 65, for example one hemisphere of the sphere 4 can be anodized to low reflectivity, while the other half remains shiny. As may be appreciated by those skilled in the art, different indicia aligned on other axes can be utilized to sense the direction of rotation. For our purposes an operator can visually determine, via optical detector 70, the nulling of rotation of sphere 4.

In operation, the operator aligns the axis of the electro-magnetic coils 24 and 26 with the known axis of the uniform component of the magnetic field that is to be measured. The sphere 4 is suspended for free rotation and is maintained below its critical temperature. The magnetic field to be measured induces the flow of the screening superconducting current on the surface of the sphere 4 which produces a counter angular momentum rotation of the sphere 4. An operator, via an optical unit 70, monitors light reflected from the rotating sphere 4.

The optical unit 70 can include a photocell focused on the sphere 4 to provide a step output whenever the dark-bright boundary crosses the field of view.

If a unit vector $\vec{S}$ represents the spin axis, unit vector $\vec{P}$ represents the symmetry axis of the pattern, and unit vector $\vec{V}$ is the optic axis of the photocell optical unit 70, then there will be a step in photocell output (i.e., $\vec{P} \cdot \vec{V} = 0$) whenever $$\cos \omega t = \cot \alpha \cot \beta$$

where $$\cos \alpha = \vec{P} \cdot \vec{S} \text{ and } \cos \beta = \vec{V} \cdot \vec{S}$$

$\omega$ = angular frequency of rotation.

Since the sphere 4 has a preferred spin axis, $\cos \alpha$ would remain constant and thus $\beta$ could be computed from the relative duration of dark and bright intervals observed by the photocell within each period. Since two angles suffice to determine a direction in space, only two photocells would be required provided there were no dead zone (i.e., $\cot \alpha \cot \beta \leq 1$). In the case of a perfect sphere 4 and an unknown axis of the uniform component of the measured magnetic field the pattern axis can wander relative to the spin axis and $\alpha$ is a variable. By introducing an additional photocell and "over determining" the spin axis, the value of $\alpha$ can be continually computed.

The operator can manually adjust potentiometer 36 which adjusts the current flow in coils 24 and 26, or the system can be made automatic with a feedback arrangement connected to each photocell of optical unit 70. The current flow creates a counter uniform magnetic field component which nulls the effect of the unknown magnetic field and accordingly nulls the rotation of the sphere 4. An ammeter 40 measures the current flow to the electro-magnetic coils 24 and 26 and is representative of the strength of the magnetic field being measured. When the sphere 4 has been nulled to a stopped position, the current flow from potentiometer 36 holds the current flow to the electro-magnetic coils 24 and 26 at a value that maintains the nulled position for sphere 4. The operator can record the null-current reading from the ammeter. The current reading is indicative of the strength of the magnetic field being measured.

An alternative optical monitoring approach is to utilize Ronchi grating on the surface of the sphere 4. If the direction of surface motion is observed from two fixed points opposite the spinning sphere 4, the spin vector is merely the cross product of the surface velocity vectors. One way of determining the surface velocity would be to view the sphere surface through a Ronchi grating, which is merely a grid of adjacent transparent and opaque strips to the incident light beam. The grating would serve as a "chopper" for the optical "signal" which would consist of reflections from the sphere surface. The noise spectrum of the output signal will have a fundamental frequency equal to the lattice spacing divided by the component of surface speed perpendicular to the rulings. Thus, a spectrum analyzer fed by a photo-tube focused on the sphere surface will reveal a noise peak decreasing in frequency as the grating is aligned parallel to the surface velocity. It is possible to determine the parallel and perpendicular position of the grating within a few degrees from the resulting shifts in the noise peak frequency.

A further illustrative example of an optical monitoring method is to actual measure the surface speed of the rotating sphere 4. The sphere 4 could be coated with a phosphorescent material that will glow in response to an ambient light. A microscope (not shown) having a circular field of view is focused on the phosphorescent coated surface of the spinning sphere 4. A pin point pulse of light is directed along the optic axis onto the surface. The time required for the resulting glowing spot to move out of the field of view would be a measure of surface speed at that point.

Calculation of the components of the spin vector proceeds from the following considerations. The velocity at a point on the surface of the sphere is given by $$\vec{v} = \vec{\omega} \times \vec{r}$$

where $\omega$ is the sphere's angular velocity and $\vec{r}$ is the radius vector to the point. If observations are made along the three coordinate axes:

$$\vec{r}_1 = r\,\hat{i}$$
$$\vec{v}_1 = \hat{j}\, r\, \omega_z - \hat{k}\, r\, \omega_y$$
$$v_1^2 = r^2 \omega_z^2 + r^2 \omega_y^2 \tag{1}$$

$$\vec{r}_2 = r\,\hat{j}$$
$$\vec{v}_2 = \hat{k}\, r\, \omega_x - \hat{i}\, r\, \omega_z$$
$$v_2^2 = r^2 \omega_x^2 + r^2 \omega_z^2 \tag{2}$$

$$\vec{r}_3 = r\,\hat{k}$$
$$\vec{v}_3 = \hat{i}\, r\, \omega_y - \hat{j}\, r\, \omega_x$$
$$v_3^2 = r^2 \omega_y^2 + r^2 \omega_x^2 \tag{3}$$

Equations (1), (2) and (3) are three simultaneous linear equations with the unknowns $\omega_x^2$, $\omega_y^2$, and $\omega_z^2$. Alternatively observations at only two points plus measurement of ω might be made inasmuch as $\omega^2 = \omega_x^2 + \omega_y^2 + \omega_z^2$. (Actually only two independent quantities are needed to determine the direction of $\vec{\omega}$. These could be the ratios $\nu_1/\nu_3$ and $\nu_2/\nu_3$, for example).

Referring to FIG. 2, a second embodiment of the present invention is disclosed as magnetometer 42 which includes a Dewar 44 having a pair of concentric walls 46 and 48 respectively.

Located between the outer wall 46 and the inner wall 48 is a bath of liquid nitrogen. Within the interior of the inner wall 48 is a bath of liquid helium. Suspended within the liquid helium is a superconducting sphere 68. Mounted within the walls of the mounting chamber 50 are three pairs of electro-magnetic coils. Coils 52 and 54 are mounted respectively on the opposite side of the mounting chamber along the X axis. Coils 56 and 58 are mounted on the Z axis, and coils 60 and 62 are mounted on the Y axis. The respective pairs of coils can be appropriately interconnected and attached to a power supply through a potentiometer (not shown) which is controlled by an operator. Each of the above-mentioned coils provides a magnetic field with a uniform component along their respective axes and that magnetic field is independently varied by the operator or automatically for example, in the manner described earlier with reference to the embodiment of FIG. 1.

For purposes of illustration, a pair of coaxial superconducting coils are disclosed on the Y axis. Superconducting coil 64 is shown in cross-section, while superconducting coils 64 and 66 can be electrically isolated from the rest of the components in the system. If desired, cores or flux return paths may be utilized on each coil, if they do not create any hysteresis or retentivity effects. Suspended within the Dewar 44 by the field of the superconducting levitation coils 64 and 66, is a hollow sphere 68 which is capable of supporting any induced superconducting current flow. The sphere 68 can be appropriately marked with a pair of traverse diametrical lines to assist any visual observation by an operator with the assistance of an optic member such as the microscope 74 is determining both the direction of rotation and the axis of rotation.

A μshield 72 is utilized to isolate the sphere 68 from the effects of any extemporaneous magnetic fields. When the temperature of the sphere 68 is lowered beneath the critical temperature of the material, the μshield 72 prevents capturing any flux within the interior of the sphere 68 which would in effect magnetize the sphere 68. The shield 72 can be movable relative to the Dewar 44 to accommodate the optical or visual monitoring.

Superconducting coils similar to coils 64 and 66 can also be placed about each of the other axes (not shown) to further help stabilize sphere 4 in a central position as shown in FIG. 2. Because the superconducting coils are electrically isolated a residual and relatively non-dissipating current flow can be created in each superconducting coil loop. It is possible to thus energize the respective superconducting coils 64 and 66 (and other coil pairs on the x and z axes, not shown) with current flow that produces a magnetic field which will properly position sphere 68 at a predetermined location.

The magnetic field that is to be measured will not induce any current in the superconducting coils of a magnitude that affects the positioning of sphere 68. Obviously, insulation means known in the prior art may be used to shield or isolate the respective coils 64 and 66 from the effects of the measured magnetic field if necessary.

As in the case described with reference to FIG. 1, current is applied to each of the coil sets 52, 54, 56, 57 and 60, 62 either by an operator observing the rotation of the sphere through microscope 74 or by an automatic optical feedback system. Individual potentiometers can be adjusted for each of the sets of coils located on the x, y and z axis. By adjusting the amount of current through the respective sets of coils, the rotation of the sphere 68 will slow and finally reach a stable non-rotating condition. The current through each of the individual ammeters is an indication of the current strength required for the three vectors in order to null out the magnetic field to be measured. A vector diagram of the three current amounts results in a total resultant current which indicates both the direction of the magnetic field and the strength of the magnetic field being measured.

A determination of the spin axis of the sphere 68 for an initial adjustment of the nulling current can be determined in a number of different manners. The following method is only suggestive and should not be considered limiting. A phosphorescent layer can be deposited on the surface of the sphere 68. Experiments have shown that phosphor will glow at temperatures at least as low as 4.2°K. An ultraviolet beam is then directed at the spinning sphere 68 to excite a portion of the phosphor. The glowing phosphor spot will then trace out a circle in a plane perpendicular to the spin axis of the sphere 68. The determination of this plane is equivalent to determining the spin axis.

The plane of rotation can be determined with the assistance of two dark field microscopes (not shown). The ultraviolet beam is focused at the center of a microscope's field of view by an annular illuminator surrounding the objective lens. Rotation of the phosphor-coated sphere 68 produces a glowing arc across the field of view. The orientation of the tangent to this arc at the intersection of the reticle crosshairs is read out on a protractor eyepiece. Since the glowing arc traces a latitude line on the spinning sphere 68, a great circle constructed perpendicular to the arc passes through the spin axis. It is clear that two such circles obtained from two separate microscopes will intersect at the sphere's poles. This construction is done mathematically and requires only the two protractor readings to determine the orientation of the spin axis relative to the orientations of the two microscopes. In practice, the two microscopes would be oriented with their optic axes east-west and north-south, both in a horizontal plane.

As can be appreciated by those skilled in the art, the magnetometer of the present invention provides numerous advantages. A prime advantage is the simplicity of the magnetometer. The rotating sphere will have an intrinsic levitation stability when it is superconducting. The use of a set of closed or shorted superconducting coils can carry persistent currents without any dissipation. Thus, once the magnetometer is started no power is required for levitation. If the sphere is rotated in a vacuum, no additional power would be needed to maintain the vacuum since outgassing is nil at superconducting temperature. In addition, the sphere would have intrinsic dimensional stability since the coefficients of thermal expansion effectively vanish at superconducting temperatures.

The particular advantages of the present invention in the environment of outer space are numerous since it can take advantage of the weightlessness, and low temperatures available in outer space.

While a preferred embodiment of the present invention has been described hereinabove, it is intended that all matter contained in the above description and shown in the accompanying drawings be interpreted as illustrative and not in a limiting sense and that all modifications, constructions and arrangement which fall within the scope and spirit of the invention may be made.

What is claimed is:

1. A magnetometer for measuring the strength of a magnetic field comprising:
   a body capable of becoming superconducting at a critical temperature;
   means for maintaining the body at a temperature below the critical temperature;
   means for supporting the body to permit free rotation of the body in response to the induced flow of superconducting current on the body by the magnetic field; and
   sensing means for determining the strength of the magnetic field as a function of the rate of rotation of the mass of the body.

2. The invention of claim 1 wherein the means for supporting the body includes at least a pair of levitation magnetic coils to counterbalance the forces of gravity whereby the body is suspended between the levitation coils.

3. The invention of claim 1 wherein the means for supporting the body includes at least a pair of closed loop superconducting coils carrying an electrical current which generates a combined uniform magnetic field and suspending field to suspend the body between the superconducting coils.

4. The invention of claim 1 wherein the means for suspending the body includes an acoustical transducer means for establishing a standing wave pressure pattern capable of holding the body at a minimum pressure position.

5. The invention of claim 1 wherein the sensing means includes at least one coil receiving electrical current for generating a uniform magnetic component to null the ortation of the body.

6. The invention of claim 5 wherein the amount of current flow to the coil to null the rotation of the body is representative of the strength of the magnetic field.

7. The invention of claim 6 further including feedback means for determining the relative rotation of the body and varying the current flow in response to the rotation to stop the rotation of the body.

8. The invention of claim 6 wherein the sensing means further includes a photodetector assembly means for producing an output signal representative of the rate of rotation of the body.

9. The invention of claim 8 wherein the body is a hollow sphere having exterior indicia to permit the determination of the body rotation by the photodetector assembly means.

10. A method of measuring the strength and direction of an ambient magnetic field with a body capable of becoming superconducting at a critical temperature, comprising the steps of:
    maintaining the body at a temperature below the critical temperature;
    suspending the body, within the magnetic field, to permit free rotation of the body about an axis in response to the induced flow of superconducting current on the body by the magnetic field; and
    sensing the rate of rotation of the mass of the body and the direction of the axis of rotation wherein the strength and direction of the magnetic field can be determined as functions thereof.

11. The invention of claim 10 further including the step of applying a torque to the body to null the magnetic field induced rotation wherein the amount of torque and the direction of the torque are representative of respectively strength and direction of the magnetic field.

12. The invention of claim 10 wherein the body is suspended by the application of a magnetic field.

13. The invention of claim 10 wherein the rate of rotation and the direction of rotation is sensed optically.

14. The invention of claim 10 wherein the body is suspended by the application of acoustical pressure.

15. The invention of claim 11 wherein the torque applied to the body to nullify its rotation is a magnetic field having a uniform component that opposes the directional component of the ambient magnetic field.

16. A magnetometer for measuring the strength and direction of a magnetic field comprising:
    a body capable of becoming superconducting at a critical temperature;
    means for maintaining the body at a temperature below the critical temperature;
    suspension means for suspending the body to permit free rotation of the body about an axis in response to the angular momentum torque generated by the induced flow of superconducting current on the body by the magnetic field; and
    sensing means for determining the strength and direction of the magnetic field as a function respectively of the rate of rotational angular momentum force imposed on the mass of the body and the direction of the axis of rotation.

17. The invention of claim 16 wherein the means for supporting the body includes at least a pair of electrically isolated closed loop superconducting coils carrying a current flow for generating a gradient magnetic field to suspend the body between the superconducting coils.

18. The invention of claim 16 wherein the means for suspending the body includes an acoustical transducer means for establishing a standing wave pressure pattern capable of suspending the body at a minimum pressure position.

19. The invention of claim 16 wherein the sensing means includes at least three coils receiving current flow and generating a uniform magnetic component to null the rotation of the body.

20. The invention of claim 19 wherein the three coils also suspend the body for free rotation.

21. The invention of claim 16 further including feedback means for determining the relative rotation of the body and varying the current flow in response to the rotation to stop the rotation of the body.

22. The invention of claim 21 wherein the sensing means further includes a photodetector assembly means for producing an output signal representative of the rate of rotation of the body.

* * * * *